M. M. CRAM.
PROFILE MEASURING AND RECORDING DEVICE.
APPLICATION FILED NOV. 25, 1918.

1,308,580.

Patented July 1, 1919.
3 SHEETS—SHEET 1.

WITNESSES
Howard D. Orr
F. T. Chapman

Marshall M. Cram,
INVENTOR,

BY
C. G. Siggers
ATTORNEY

THE COLUMBIA PLANOGRAPH CO., WASHINGTON, D. C.

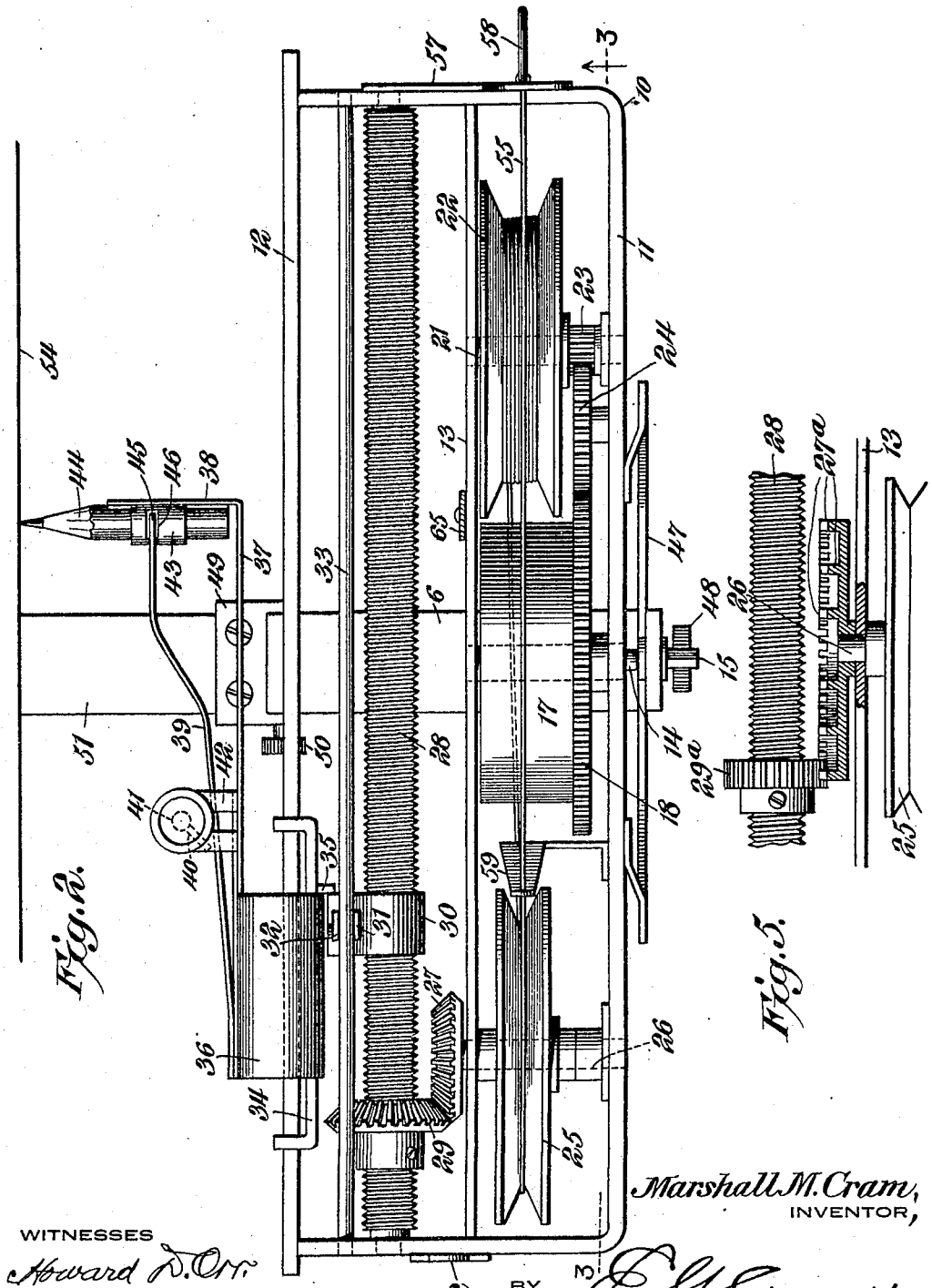

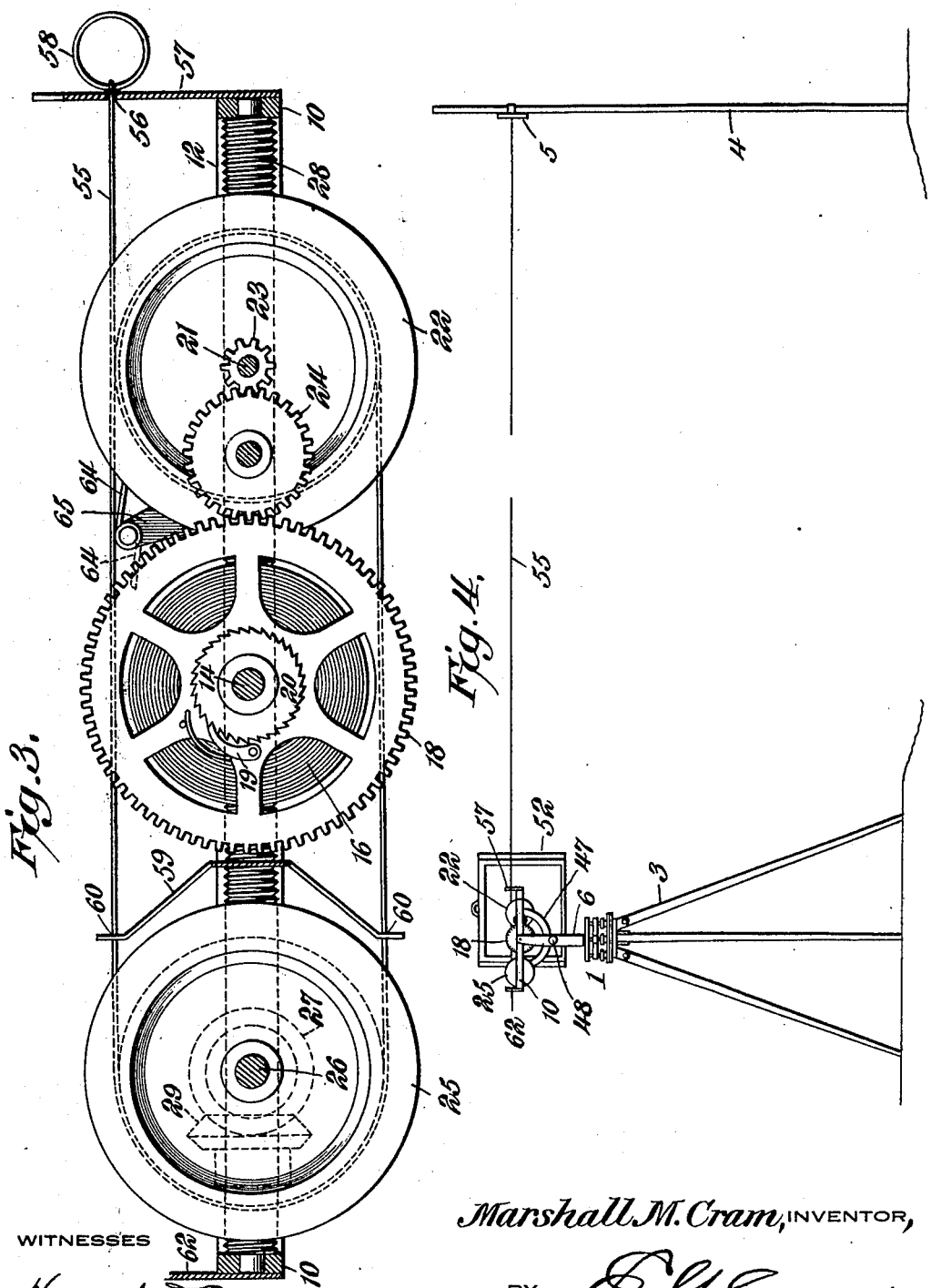

UNITED STATES PATENT OFFICE.

MARSHALL MOSES CRAM, OF NORTH MANKATO, MINNESOTA.

PROFILE MEASURING AND RECORDING DEVICE.

1,308,580.     Specification of Letters Patent.     Patented July 1, 1919.

Application filed November 25, 1918. Serial No. 264,019.

*To all whom it may concern:*

Be it known that I, MARSHALL M. CRAM, a citizen of the United States, residing at North Mankato, in the county of Nicollet and State of Minnesota, have invented a new and useful Profile Measuring and Recording Device, of which the following is a specification.

This invention has reference to profile measuring and recording devices and is an improvement upon the profile measuring and recording device shown and described in Letters Patent Number 987,863, granted to me on March 28, 1911.

The object of the invention is to provide an instrument of simple and efficient construction for producing cross sections, profiles and maps of small areas of land by automatically tracing upon a sheet of paper the profile of the surface over which a target is carried.

In accordance with the invention a tablet upon which the tracing is made does not oscillate but is held rigidly while a part of the instrument that carries the marking implement, which may be a pencil, is oscillated or swung up and down by the operator to maintain sights on the pencil carrying part of the instrument in line with the target upon the rod as the latter is carried up and down a slope or over elevations or into depressions in the surface. In this manner the center of the instrument, the point of the pencil and a point on the target are always in a straight line. In operating the instrument, there is first produced upon the tablet by the leveled instrument a straight mark representing a level and then by a return of the pencil producing the straight mark to the first position and propelling the pencil by the moving target and rod, keeping the part of the instrument carrying the pencil properly sighted upon the target, there is produced another mark indicating the profile of the surface over which the target and rod are moved. In this way the instrument automatically plats the contour, cross section or profile of the surface over which it is used and effects saving of calculations necessary in reducing level-rod readings to elevations and the platting of these elevations by the draftsman. The area included between the profile line and the grade line first drawn is measured with a planimeter and the result is used in computing the cubic yards of cut or fill.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Fig. 2 is a plan view of the pencil-carrying and feeding frame.

Fig. 3 is a section on the line 3—3 of Fig. 2.

Fig. 4 is a diagrammatic view illustrating the manner of using the instrument.

Fig. 5 is a detail view, partly in section and partly in elevation, showing a modified form of gearing between the drive sheave and the feed screw.

Figure 1:
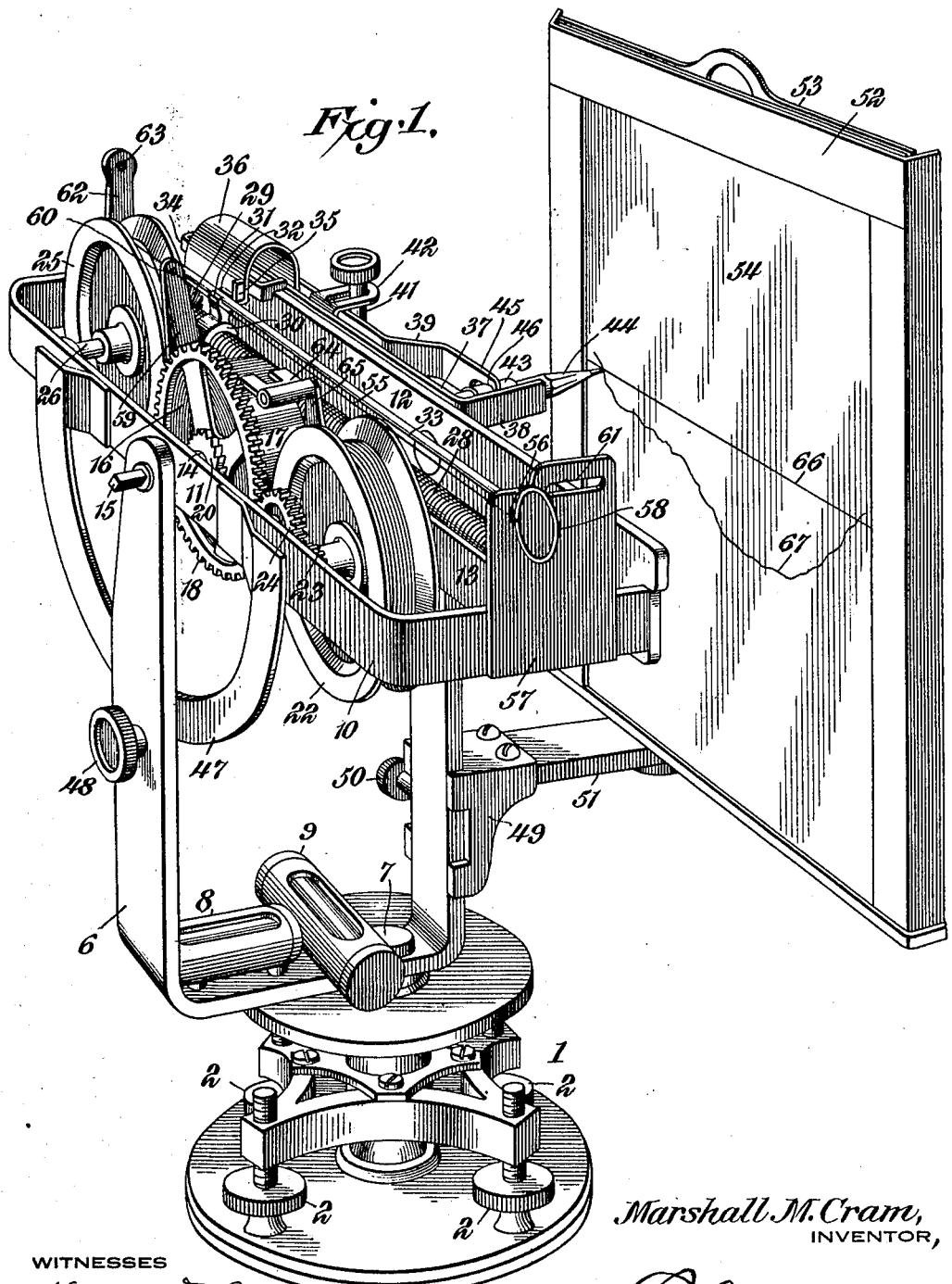
Figure 1 is a perspective view of the head of the instrument.

Referring to the drawings, there is shown in Figs. 1 and 4 a tripod head 1 provided with the usual leveling screws 2 and mounted upon a tripod 3 shown in Fig. 4. Since the tripod with its head may follow the usual custom of such structures as employed in surveying instruments, no particular description or detailed illustration of the parts making up the tripod or tripod head is needed. Moreover, there is shown in Fig. 4 a leveling rod 4 provided with an adjustable target 5, both of customary construction and hence needing no particular description.

Mounted on the tripod head 1 is an upstanding U-frame 6 having a swivel connection 7 with the tripod head permitting the turning of the frame on the tripod head about an upright axis. The frame 6 is also provided with levels 8, 9 respectively, as is customary in surveying instruments.

Between the upper or free ends of the legs of the frame 6 there is mounted another frame 10 shown as of somewhat elongated rectangular shape. This frame has side bars 11, 12 between which is located an intermediate bar 13 fast in the end bars of the frame and parallel with the side bar 11 but spaced a sufficient distance therefrom to accommodate certain structures. About midway of the length of the side bar 11 there is journaled in said side bar and the intermediate bar 13 an arbor 14 prolonged through the upper end of the adjacent leg of the frame 6 and terminating in a squared portion 15 to receive a winding key. The arbor 14 carries a coiled spring 16 and a spring drum 17 at one end of which there is secured a gear wheel 18 mounted to turn on the arbor 14. The usual winding pawl 19 on the gear wheel 18 and holding ratchet 20 on the arbor 14 is provided so that the spring may be put under tension by winding it with a suitable key applied to the end 15 of the arbor 14 whereby a driving tendency is imparted to the gear wheel 18 through the ratchet 20 and pawl 19.

Near one end of the frame 10 and mounted on an arbor 21 carried by the side bar 11 and intermediate bar 13, is a drum 22 with a pinion 23 fast thereto. Meshing with the pinion 23 and with the gear wheel 18 is an idler pinion 24 mounted on the side bar 11, whereby rotative movement of the gear wheel 18 imparts movement to the drum 22 through the idler pinion 24 and the other pinion 23 fast to the drum.

Mounted in the frame 10 between the side bars 11 and 13 but on the opposite side of the gear wheel 18 is a sheave 25 fast on a shaft 26 journaled in the bars 11 and 13 and extending through the bar 13 toward the other side bar 12, the shaft 26 there carrying a bevel pinion 27.

Journaled at the ends in the end members of the frame 10 and extending between them is a screw rod 28 on which is secured a bevel pinion 29 meshing with the bevel pinion 26 so that on rotating the pinion 29 the screw rod 28 participates in the rotation.

Mounted on the screw 28 is a nut 30 provided with upstanding lugs 31, 32 embracing a rod 33 carried by and extending between the end bars of the frame 10 and in spaced parallel relation with the side bar 12. The lugs 31 and 32 sufficiently embrace the rod 33 to hold the nut 30 against rotative movements but permit it to slide freely along the rod 33, wherefore, on rotating the screw 28 the nut 30 is fed in one direction or the other, as the case may be, by the screw.

Mounted to slide along the side bar 12 is a carriage 34 having a projection or lug 35 thereon in the path of the stud 32. Fast to the carriage 34 is a hood 36 overhanging the side bar 12 and fast to the hood outside of the frame 10 is one end of an arm 37, the other end of which is free and has an angle extension 38 directed away from the side bar 12. Carried by the hood 36 is one end of an elongated flat spring 39 under the control of a finger 40 projecting radially from a stem 41 mounted to rotate in a supporting bracket 42 carried by the arm 37. The finger 40 is so positioned as to engage the spring 39 to move its free end against the normal tendency of the spring, which tendency is to move away from the arm 37. Mounted to slide on the angle extension 38 is a sleeve 43 constituting a holder for a pencil 44. The free end of the spring 39 is forked as shown at 45, and embraces the sleeve 43 which has notches 46 therein to receive the fork.

Secured to the side bar 11 outside of the frame 10 are the ends of an arc 47 so located that the center of the arc coincides with the shaft or arbor 14. The arc 47 and the frame 10 participate in rocking movements about the axis of the arbor 14 as a center, and a clamp screw 48 is mounted on the corresponding leg of the frame 6 in position to engage the arc 47 and hold the frame 10 in any desired position of angular adjustment.

Applied to that leg of the frame 6 secured to the side member 12 is a slide 49 provided with a clamp screw 50 by means of which the slide may be made fast to the leg of the frame 6 carrying it, wherefore, the frame 6 being an upright frame, the slide 49 may be positioned at any desired height along the frame 6. The slide 49 carries an arm 51 projecting therefrom away from the frame 6 and at the outer end the arm 51 carries a tablet support 52 upstanding therefrom and arranged parallel with the side 12 of the frame 10. Adapted to the support 52 is a tablet 53 on which may be secured a sheet 54 of paper across which the pencil 44 may be caused to travel in such manner as to make a mark upon the paper sheet.

Fixed at one end to and wound upon the drum 22 is a strand 55 of flexible wire or other material, this strand continuing to and about the sheave 25 and then returning over the drum 22 and through a hole 56 in a plate 57 upstanding from one end bar of the frame 10, such end bar being the forward end of the frame in the operative position of the instrument. The strand at its forward end is provided with a ring 58 for manipulating the strand and for applying it to the rod 4. The upper and lower runs of the strand 55 are supported, adjacent to the sheave 25, by a guide strip 59 carried by an appropriate part of the side bar 11 and provided with holes 60 traversed by the strand.

The plate 57 has a peep hole 61 and erected on the other end bar of the frame 10 is another plate 62 provided with a peep hole 63. The two peep holes or sights 61 and 63 are arranged in a line parallel with the travel of the pencil 44.

A dog or catch 64 carried by an arm 65, which may be made fast to the bar 13, is so positioned as to engage the flanges of the drum 22 to prevent a too sudden rewinding of the strand or line 55 should it be accidentally disconnected from the rod 4. The dog 64 is shown thrown back out of the way in Fig. 1 and in engaging position in Fig. 3.

When it is desired to use the instrument the tripod is set up in the usual way and the frames 6 and 10 are leveled. It is to be assumed that a sheet 54 of paper has been applied to the tablet 53 and held there by buttons, or thumb tacks, or in any other appropriate manner, and the slide 49 has been clamped on the frame 6 at the desired height. Furthermore, it is assumed that the pencil 44 has been withdrawn from engaging position with the paper 54 by a suitable manipulation of the finger 40 to cause the latter to engage the spring 39 and withdraw the pencil to the requisite degree. It is also assumed that the spring 16 has been placed under suitable tension to completely wind the strand or line 55, further winding of the strand being prevented by the engagement of the ring 58 with the plate 57. The pencil is released by withdrawing the finger 40 from engagement with the spring 39 so that the point of the pencil bears upon the paper 54. The carriage 34 is free to be pushed forwardly by hand and in so doing produces a straight mark 66 across the paper 54. This mark indicates a horizontal line through that point in the surface directly under the center of the instrument. The slide is then drawn back until it is in contact with the nut 30 which is assumed to have been withdrawn to its fully retracted position. The target 5 on the rod 4 is set at a height equal to the height of the sights 61, 63 of the instrument and the strand or line 55 is attached to the rod by means of the ring 58. The clamp 48 is released leaving the frame 10 free to swing on its pivots or axis. An assistant carries the rod in a vertical position across the surface to be platted and the operator at the instrument keeps the sights or peeps 61 and 63 directed toward the target, tilting the frame 10 up and down as needed. As the line 55 is drawn out it unwinds from the drum 22, thereby putting the spring 16 under additional tension, the initial tension being small. As the line is drawn out its passage about the sheave 25 causes the latter to rotate, thereby, through the pinions 27 and 29, rotating the screw 28. This causes the nut 30 to travel along the screw since the nut is held from rotation, and engagement of the stud 32 with the stud 35 causes the carriage 34 to travel with the nut 30, thereby propelling the pencil 44 in the same direction. The pencil being in contact with the paper 54 produces a mark 67 thereon, which mark is an exact profile of the surface traversed by the assistant carrying the rod 4. When the profile has been completed the operator at the instrument withdraws the pencil 44 from contact with the paper 54, by rotating the finger 40 to an extent retracting the spring 39. The assistant then brings the rod back to the instrument, the tension of the spring 16 rewinding the line upon the drum or spool 22. The instrument may then be turned on its vehicle axis in any desired direction, the tablet raised or lowered on the frame 6 and another profile made on the same paper. When all the desired profiles have been made at the one station, the whole instrument may be moved to another station and the operation repeated. Separate sheets of paper may be used or the paper may be in roll form so that long sheets of paper may be employed. Each profile is marked to indicate at what station it is made and whether to right or left. The grade line of the proposed work is drawn on each profile at its proper distance above or below the horizontal line through the station and the area included between the profile line and the grade line is measured by a suitable instrument and the result used in computing the amount of cut or fill needed.

Without confining the instrument to any particular size or proportion of parts, it may be assumed that it is constructed so as to operate on the scale of one to ninety-six, or one-eighth of an inch to the foot and it may be further assumed that the line is sixty-five feet long and the pencil is so adjusted that its point is one-sixteenth of an inch ahead of the center of oscillation of the oscillatory frame. It is because the target rod, in an instrument of the dimensions assumed, starts one-half of a foot from the center of the instrument that the pencil point must start one-sixteenth of an inch from the center or zero point on the paper.

In order to permit the ready changing of the scale upon which the instrument may operate, an arrangement such as shown in Fig. 5 may be adopted, without, however, limitation to such particular arrangement. Instead of the bevel gear wheel 27 and bevel pinion 29 there may be provided a series of crown gears 27ª in concentric arrangement and integrally united as a single gear wheel. Mounted on the screw 28 is a spur pinion 29ª adjustable along the screw into meshing engagement with any one of the crown gears 27ª. This permits a change in the ratio of transmission between the driving sheave 25 and the feed screw 28. Of course, any other suitable arrangement for the purpose may be employed.

What is claimed is:—

1. In a device of the class described, a support for location at a fixed point over the surface to be measured, a device movable to and from the support and adapted to be carried over the surface to be measured, a line for connection with the movable device, and recording mechanism including a record-receiving surface and a record-producing device for engaging the record-receiving surface, the record-producing device being connected to the line and movable thereby over the receiving surface and having an oscillatory mounting on the support, whereby the record-producing device may be oscillated in its travel over the record-receiving surface in conformity with changes in level of the device movable to and from the recording mechanism.

2. In a device of the class described, a support adapted to be located at a fixed point over the surface to be measured, record-producing means having an oscillatory mounting on the support and having a range of travel with respect to said support, a device having a record-receiving surface and mounted on the support in fixed relation thereto and also adapted to be engaged by the record-producing means, a device movable to and from the support and adapted to be carried over the surface to be measured, and a line connected with the movable device and with the record-producing means for actuating the latter, whereby variations in level of the surface over which the movable device is carried are indicated on the record-receiving device by progressive movements of the record-producing means and oscillatory movements of the carrying means for said record-producing means.

3. In a device of the class described, a support adapted to be located at a fixed point over the surface to be measured, record-producing means having an oscillatory mounting on the support and having a range of travel with respect to said support, a device having a record-receiving surface and mounted on the support in fixed relation thereto and also adapted to be engaged by the record-producing means, a device movable to and from the support and adapted to be carried over the surface to be measured, and a line connected with the movable device and with the record-producing means for actuating the latter, whereby variations in level of the surface over which the movable device is carried are indicated on the record-receiving device by progressive movements of the record-producing means and oscillatory movements of the carrying means for said record-producing means, said carrying means having sighting means whereby the carrying means may be oscillated by an operator in accordance with the variations in level of the movable device.

4. In a device of the class described, a support, an oscillatory member mounted on the support, a line carried by the oscillatory member and extending therefrom, a device movable toward and from the oscillatory member and adapted to have the line attached to it, marking means on the oscillatory member and mounted to travel along the latter by the pull of the line and to oscillate with the oscillatory member, and record-receiving means carried by the support in fixed relation thereto and adapted to be engaged by the marking means in its progressive and oscillatory movements.

5. In a device of the class described, recording mechanism including record-receiving means and marking means therefor, and a rockable member carrying the marking means and said marking means being connected to the rockable member for travel therealong, means for imparting progressive movement to the marking means over the record-receiving means, and sighting means on the rockable means.

6. In a device of the class described, record-producing means, record-receiving means, a rockable carrier for the record-producing means, means for imparting progressive movement of the record-producing means along the record-receiving means, and sighting means for directing rocking movements of the rockable means during progressive movement of the record-producing means.

7. In a device of the class described, a fixed support for a record-receiving tablet, and a marker holder movable across a tablet on the tablet support and mounted to rock on an axis perpendicular to a tablet mounted on the tablet support, and means for progressively moving the marker holder and a marker carried thereby across a tablet on the tablet support.

8. In a device of the class described, a fixed support for a record-receiving tablet, and a marker holder movable across a tablet, on the tablet support and mounted to rock on an axis perpendicular to a tablet mounted on the tablet support, and means for progressively moving the marker holder and a marker carried thereby across a tablet on the tablet support, and sighting means associated with the rockable support for following movements of a distant object connected to and actuating the marker holder.

9. In a device of the class described, a relatively fixed holder for a record sheet, a carrier for a marker movable across the record sheet to produce a record mark thereon, a supporting member for the marker carrier rockable about an axis perpendicular to the surface of the record sheet, a device movable toward and from the rockable member and connected to the marker carrier for actuating the latter along the rockable member, and sighting means for following the movable device by rocking movements of the rockable member.

10. In a device of the class described, a leveling and swivel head, a holder for a record-receiving tablet carried by the swivel head, a rockable member carried by the swivel head adjacent to the tablet holder with its axis of rocking perpendicular to a tablet on the tablet holder, a spring actuated winding drum on the rockable member, a sheave on the rockable member, a line connected to the winding drum and directed about the sheave, a rod with a target thereon for connection to the line and movable away from the rockable member, a carrier for a marker mounted on the rockable member to travel therealong, and connections between the sheave and the marker carrier for causing movements of the marker across a record tablet on the tablet holder by movements of the line actuating the winding drum.

11. In a device of the class described, a holder for a record sheet, a marker carrier associated with the record sheet for producing a mark on the latter, a rockable member on which the marker carrier is mounted and along which it is movable, a marker on the carrier participating in the rocking movements of the rockable member, a line and connections therefrom to the marker carrier, a target movable toward and from the rockable member and adapted to be connected to the line, and sighting means on the rockable member for following the target in up and down movements of the latter by rocking the rockable member.

12. In a device of the class described, a leveling head, a holder for a record sheet carried by the head, a rockable frame mounted on the head for movements about a substantially horizontal axis when the head is leveled, a marker carrier on the frame and movable therealong, a feed screw and nut on the frame for engaging and propelling the marker carrier, a sheave and gearing between the sheave and feeding screw for actuating the latter by the sheave, a spring actuated winding drum mounted in the frame, and a line connected to the drum and carried about the sheave for actuating the latter in opposition to the spring when the line is drawn away from the frame.

13. In a device of the class described, a leveling head, a holder for a record sheet carried by the head, a rockable frame mounted on the head for movements about a substantially horizontal axis when the head is leveled, a marker carrier on the frame and movable therealong, a feed screw and nut on the frame for engaging and propelling the marker carrier, a sheave, gearing between the sheave and feeding screw for actuating the latter by the sheave, a spring actuated winding drum mounted in the frame, and a line connected to the drum and carried about the sheave for actuating the latter in opposition to the spring when the line is drawn away from the frame, said frame being provided with spaced alined sighting means for permitting following variations in the level of a moving object connected to the line by rocking movements of the frame.

14. In a device of the class described, recording devices comprising a tablet holder and a marker holder in associated relation, with a marker in the marker holder movable across a tablet in the tablet holder to produce a mark thereon, a rockable support for the marker holder along which the marker holder is mounted to travel in a line perpendicular to the axis of rocking of the rockable member, a device movable to and from the recording mechanism and adapted to be carried over a surface to be measured, a line for connection with the movable device, and mechanism between the line and the marker holder for causing progressive movements of the latter along the rockable frame.

15. In a device of the class described, a leveling head including an upright yoke swiveled thereon, a tablet holder connected to the yoke and normally fixed thereto, a frame mounted at the upper end of the yoke for rocking movements about an axis which is horizontal when the head is leveled, with the axis perpendicular to the face of a tablet carried by the tablet holder, a marker holder on and movable along the frame across the face of a tablet in the tablet holder, a screw mounted in the frame, a nut on the screw with the marker holder and nut having coacting parts for causing the nut to engage and propel the marker holder along the frame, gearing for actuating the screw, a sheave connected to the gearing, a winding drum and spring-actuating means therefor mounted in the frame, a line guided in the frame, extending about the sheave and wound on the drum, a rod and a target thereon for connection with the line and movable toward and from the frame, and sighting means on the frame to permit view of the target by the eye of an observer by rocking movements of the frame, whereby the marker as propelled by the line and by participation in the rocking movements of the frame will produce upon the tablet a mark corresponding to the profile or contour of the surface traversed by the rod.

In testimony that I claim the foregoing as my own, I have hereto affixed my signature.

MARSHALL MOSES CRAM.

Witnesses:
ELEONORA A. BAUCH,
OLIVE GRIFFITH.